Patented Aug. 11, 1953

UNITED STATES PATENT OFFICE 2,648,694

HIGHER FATTY ACID SYNTHESIS FROM OXO BOTTOMS

Ralph Burgess Mason, Baton Rouge, La., assignor to Standard Oil Development Company, a corporation of Delaware No Drawing. Application September 16, 1950, Serial No. 185,325

6 Claims. (Cl. 260—413)

This invention relates to a novel process for the preparation of acids and acidic products by a catalytic carboxylation reaction and, more specifically, to the preparation of such acid products from by-products of the Oxo reaction.

A novel process has been discovered by which the higher molecular weight by-products of the Oxo reaction, including mixtures of the higher alcohols, esters, acetals, and ethers, can be readily converted to acids. These Oxo products are employed for starting materials in a catalytic acid synthesis using carbon monoxide with boron trifluoride as the preferred carboxylation catalyst. It is also a preferred mode of operation to employ certain metallic salts as catalyst promoters.

It is well known that oxygenated organic compounds may be synthesized from olefins by reaction of the latter with carbon monoxide and hydrogen in the presence of a carbonylation catalyst followed by catalytic hydrogenation in a two-stage process. In the first stage, the olefinic material, the carbonylation catalyst, and CO and $H_2$ are reacted to give a product which consists predominantly of aldehydes. This material is catalytically hydrogenated in the second stage to give the corresponding alcohols. The overall reaction may be formulated as follows:

Stage 1. $R-CH=CH_2 + CO + H_2 \rightarrow RCH_2-CH_2CHO$

Stage 2. $RCH_2CH_2CHO + H_2 \rightarrow RCH_2CH_2CH_2OH$

Alcohols from the second stage of the reaction are used as intermediates for the preparation of plasticizers and detergents. Alcohols prepared by the Oxo reaction and having from eight to sixteen carbon atoms find maximum usefulness for these purposes.

One of the serious problems that has been encountered in the carbonylation or oxonation reaction, as the first stage is frequently designated, has been the formation of secondary reaction products. The carbonylation reaction is highly exothermic, with a heat release of the same high order of magnitude as in the hydrocarbon synthesis reaction, about 35 to 50 Kcal/gram mole olefinic double bond reacted. For this and other reasons, secondary reaction products tend to form and careful temperature control is necessary in the carbonylation reaction zone to minimize this secondary reaction product formation. For instance, the decomposition of the carbonylation catalyst to metallic cobalt reaches an appreciable rate above 350° F. The presence of cobalt metal catalyzes such secondary reactions as polymerization of aldehydes, aldol condensations as well as hydrogenation of the aldehydes to alcohols which further react to yield acetals and hemiacetals with the aldehydes present. Esters may also be produced by a Cannizzaro type reaction.

In the hydrogenation stage, in the presence of the hydrogenation catalysts and under the conditions employed, further condensations and reactions of the initially formed aldehydes and alcohols take place to give additional high-boiling impurities which are generally allowed to remain as the "bottoms" after the distillation of the main portion of the alcohol is completed.

In a process for the manufacture of iso-octyl alcohol by a two-stage Oxo process using $C_7$ olefinic feed, the final distillation of the crude $C_8$ alcohol product results in a bottom fraction representing about 15% to 30% of the crude alcohol charge to the distillation zone. This bottoms fraction consists of $C_8$ and $C_9$ alcohols, as well as $C_{15}$–$C_{16}$ alcohols, $C_{24}$ acetals, and $C_{16}$ ethers. Of these constituents, the $C_8$ alcohols represent the final traces (1–8%) remaining in the bottoms from the distillation of the main product. The $C_9$ alcohols representing 5% to 30% of the bottoms are generally degraded to bottoms since the presence of this higher alcohol in the $C_8$ alcohol product has an adverse effect on the use of the $C_8$ alcohol for manufacture of plasticizers, such as dioctyl phthalates. Poorer colors and more brittle plasticizers result from the inclusion of even small amounts of $C_9$ alcohols in the $C_8$ alcohol product. The remaining 70% of the so-called bottoms consists primarily of higher-boiling oxygenated compounds formed by side reactions as outlined above as occurring in either the first or second stage of the $C_8$ alcohol process. As clearly as can be determined by chemical analysis and infra-red absorption spectrographic study, these constituents were identified as $C_{15}$ secondary alcohols, $C_{15}$ aldehydes or ketones, $C_{24}$ acetals, $C_{22}$ ester of $C_{14}$ naphthenic acids used in making the cobalt catalyst for the first or oxonation stage, and saturated and unsaturated $C_{16}$ ethers. A typical chemical analysis of the higher-boiling oxygenated compounds obtained in a plant, and free from $C_8$–$C_9$ alcohols fraction, is shown in Table I. The hydroxyl number, free and combined carbonyl numbers, and saponification and acid numbers are expressed in terms of milligrams of potassium hydroxide per gram of sample analyzed.

TABLE I

*Typical composition of the Oxo alcohol bottoms*

| Chemical Analysis | | Constituents, percent by wt. |
|---|---|---|
| Hydroxyl No | 95 | 48.6% $C_{15}$–$C_{16}$ alcohol. |
| Free Carbonyl No | 0.5 | 0.2% $C_{15}$–$C_{16}$ aldehyde or ketone. |
| Combined Carbonyl No | 29 | 19.1% $C_{24}$ acetal. |
| Saponification No | 21 | 14.7% $C_{22}$ (octyl naphthenate) ester. |
| Acid No | 0.2 | 17.4% Saturated $C_{16}$ ether (dioctyl ether).[1] |

[1] Calculated by difference.

Analytical results obtained by chemical and infra-red methods appear to be in essentially good agreement as indicated by their comparison in Table II below:

TABLE II

*Comparison of analyses of Oxo alcohol bottoms*

| | Chemical Method | Infra-red Method |
|---|---|---|
| Percent $C_{15}$-$C_{16}$ alcohols | 48.6 | 43 |
| Percent $C_{15}$-$C_{16}$ ketones | 0.2 | 4 |
| Percent $C_{22}$ ester | 14.7 | 13 |
| Percent $C_{24}$ acetal | 19.1 | 9 |
| Percent acid | Trace | |
| Percent saturated $C_{16}$ ether | 17.4 | 27 |
| Percent unsaturated $C_{16}$ ether | | 3 |

Certain cuts were selected on the basis of the distillation curve of the bottoms and these cuts were used to obtain infra-red spectra on the Baird instrument. By this method, it was determined that the various compound types occurred in these fractions in the percentage ranges shown in Table III.

TABLE III

*Compound types found in Oxo bottoms fractions*

| Compound Type | Percentage Range of Distillate in Which Present |
|---|---|
| $C_8$ Alcohol | 0–15. |
| $C_9$ Alcohol | 10–35. |
| $C_{16}$ Saturated ether | 20–60 (concentrated at about 40%). |
| Higher alcohol ($C_{15}$-$C_{16}$) | 40–76 (concentrated at around 60% but mixed with appreciable ether). |
| Organic Carbonyl Compounds | Evident in all cuts examined from 35–76%. Esters appear to be more evident in higher boiling range. Lower boiling ranges are suggestive of ketones. |
| Unsaturation | Evident in small amounts in all cuts examined from 35–76%. |
| Acetal | Small amount may be present 74–76% cut. |

Thus it can readily be seen that the synthetic Oxo processes give complex mixtures of compounds having various carbon structures in the molecules and having varied molecular weights. Separation and isolation of the high-boiling non-alcoholic impurities occurring in the Oxo bottoms are particularly difficult. Sometimes it is possible to separate many of these mixtures into specific components and narrow fractions by distillation, solvent extraction, and the like, but separations from the standpoint of obtaining substantially pure homogeneous fractions of relatively pure compounds in an economic process of impossible using the present known methods. In some cases, these difficultly separable mixtures are simply sent to slop or used in relatively cheap fuels. Thus, utilization of these higher-boiling impurities which are formed in substantial amounts becomes a very important factor in governing the extent of application of the Oxo process, as well as being a powerful economic factor.

This invention is mainly concerned with an economical synthetic process to convert these bottoms products into useful chemicals, particularly acidic products having relatively more commercial value than the starting materials. This synthetic reaction is applicable to various synthetic fractions derived from reaction products of the Oxo class which will contain alcohols, olefins and other compounds. In general, the starting feed mixtures are the Oxo bottoms after removal of the $C_8$ and $C_9$ alcohols and are composed of compounds having at least ten carbon atoms, and ordinarily from fifteen to twenty or more carbon atoms. These fractions are obtained by the so-called Oxo synthesis, and are the bottoms which remain after distillation of the main alcohol product. These higher-boiling Oxo synthesis products include the higher molecular weight alcohols and aldehydes as well as relatively large amounts of acetals, hemiacetals, saturated and unsaturated ethers, and esters which may also be present.

It has been known that fatty acids and carboxylated products in general can be prepared from simple olefinic hydrocarbons by reaction of these hydrocarbons with carbon monoxide and steam in the presence of various catalysts. The reaction has commonly been carried out by a one-step process. This invention, however, is directed to the preparation of acidic products from the higher-boiling condensation materials which are obtained in Oxo process and which constitute about 20% to 30% of the feed to the Oxo process. This material is not simple olefinic material but contains a complex mixture of ethers, acetals, hemiacetals, alcohols, etc. This mixture of condensation products is converted by this novel process into useful products, chiefly, fatty acids and esters, by reaction with carbon monoxide and preferably in the absence of water. The conditions which may be employed vary with the catalyst which is used. Catalysts which have been variously proposed for the synthetic reaction include various metals and carbonyl-forming metals, such as cobalt, nickel, iron, and copper. In this reaction, it has been found preferable to employ acidic type catalysts, for instance, halogen derivatives of boron, such as boron trifluoride. In addition, the use of a metallic salt promoter, specifically, nickel acetate, has been found to give better results. Although metallic carbonyls and metallic salts are inferior as catalysts in the production of fatty acid products from by-products of the Oxo reaction, metals and metal salts which tend to promote carbonyl formation in the presence of the carbon monoxide reactant have thus been found to be of substantial advantage when used in small amounts in conjunction with boron trifluoride as the major catalyst.

The high-boiling mixture of by-products to be used in the acid synthesis may, if desired, be treated in various ways prior to its use as feed. For instance, a preliminary fractionation by distillation may be used. Solvent extraction or other types of selective process, for instance, to remove inhibitors, may be employed. Certain treating methods, such as acid or alkali washes, may also be used to give a better quality feed material for the acid synthesis.

Generally, when operating under optimum conditions using higher-boiling bottoms mixtures obtained from an Oxo process in which a $C_7$ olefinic hydrocarbon stream was the starting material, yields of acid in the range of 50% to 65% by weight, based on the original feed, can be obtained. Under optimum conditions, the yield of acidic product consists predominantly of free acids with very little ester product as indicated by a comparison of the saponification number with the acid number. A lowered yield of recovered acid reflects correspondingly in a higher yield of unsaponifiable material in the recovered products from the acid synthesis. Recycle of this unsaponifiable material from the first acid synthesis to subject it to a second synthesis step can be employed to increase the over-all yield from the feed material. It is to be understood that the exact composition of the Oxo bottoms which is employed as the feed stock may necessitate some minor variations in operating conditions in order to get optimum results.

Although it has been found that different acid syntheses can be carried out at temperatures in the range of 100°–500° F., the optimum range for the reaction is from 200°–300° F. when boron trifluoride is employed as a catalyst. Although it is necessary to use a temperature sufficiently high in order to obtain a satisfactory reaction, temperatures in excess of 300° F. have been found to result in lowered yields of acidic products. This adverse effect of high temperature may be caused by the thermal sensitivity of the higher molecular weight feeds. The acid synthesis is carried out at superatmospheric pressure, the carbon monoxide reactant being employed to maintain the necessary pressure for the reaction. Pressures in the range of 500 to 10,000 p. s. i. g. may be used, the optimum operating range being 3,000 to 5,000 p. s. i. g. When employing boron trifluoride as a catalyst, the mole ratio of feed to boron trifluoride should be maintained in the range of 1/0.1 to 1/1.

Conditions for satisfactory operation may vary somewhat when other types of catalysts are used; for instance, when employing metals and metal carbonyls as catalysts, temperatures in the range of 200°–600° F. can be employed with pressures in the range of 1,000 to 15,000 p. s. i. g.

Although in ordinary fatty acid syntheses using carbon monoxide and olefinic hydrocarbons, water is considered to be desirable, it has been found that water exercises an adverse effect on the process of this invention in that a reduced yield of acid is obtained when water is introduced into the synthesis reaction. Thus, any large quantity of water should be excluded while carrying out the reaction.

The carboxylated product which consists predominantly of acid is treated with an excess of aqueous caustic in order to effect saponification.

The unsaponifiable material can then be removed from the mixture by any convenient method such as by steam distillation followed by simple separation or by solvent extraction. The acid product can be obtained from the residual soap by acidification with dilute acid and isolation of the free fatty acids thus obtained. Saponification recovery methods have the advantage in that they result in the recovery of acids from any esters present in the final products. The process of reacting the carbon monoxide with the Oxo bottoms in the presence of a catalyst is preferably carried out on a continuous scale. For instance, tubular convertors may be employed with the reactants and/or the catalyst being introduced at one or more points within the reaction vessel. In some instances, it may be preferable to employ tubular reaction vessels in which the temperature and pressure are not uniform throughout the entire reaction zone. The apparatus which may be employed for carrying out the reaction can be any one of the conventional types and is preferably one in which the temperature can be readily controlled. The reaction vessels employed in the process of the invention may be constructed of any material which is capable of withstanding corrosion by the catalyst and by the acids produced. These materials include certain types of steel, as well as copper, silver, and various alloys. Reaction vessels may also be lined with inert materials such as glass, porcelain, and the like.

Table IV below shows comparative data in which the Oxo bottoms from an Oxo reaction using a $C_7$ olefin fraction were subjected to acid synthesis reaction with excess carbon monoxide employing boron trifluoride as a catalyst. Runs 1, 2, and 3 shows the effect of temperature increase on the yield of acid obtained, yields of the order of 50 weight percent based on the feed being obtained with reaction temperatures of 250°–300° F., while at 350° F. a yield of only 25 weight percent was obtained.

TABLE IV

| Run No. | | 1 | 2 | 3 |
|---|---|---|---|---|
| Feed | | $C_7$ Oxo Bottoms | $C_7$ Oxo Bottoms | $C_7$ Oxo Bottoms. |
| Catalyst | | Boron Trifluoride | Boron Trifluoride | Boron Trifluoride. |
| Mole Ratio, Feed/Catalyst | | 1/0.62 | 1/0.67 | 1/0.58 |
| Added gas | | Carbon Monoxide | Carbon Monoxide | Carbon Monoxide. |
| Pressure, p. s. i. g. | | 3,500 | 3,500 | 3,500. |
| Temperature, ° F. | | 250 | 300 | 350. |
| Hours of Run | | 5 | 5 | 5. |
| Recovered Product | Feed | | | |
| Gravity, ° API | 36.6 | 28.7 | 30.6 | 32.7 |
| Acid No. | nil | 138 | 128 | 74. |
| Sapon. No. | 12.8 | 184 | 128 | 98. |
| Bromine No. | 12 | 2 | 2 | 4. |
| Hydroxyl No. | 134 | 5 | | |
| Recovered Acids | Feed | | | |
| Wt. Percent on Feed | | 56 | 50 | 25. |
| Gravity, ° API | 36.6 | 24.6 | 23.7 | |
| Acid No. | nil | 228 | 226 | 191. |
| Sapon. No. | 12.8 | 228 | 226 | 194. |
| Bromine No. | 12 | 0 | 0 | |
| Unsaponifiable: | | | | |
| Steam, Volatile | Feed | | | |
| Wt. Percent on Feed | | 8.5 | 16 | 16. |
| Gravity, ° API | 36.6 | | 51.9 | 50.6. |
| Acid No. | nil | 0.9 | 0.3 | nil. |
| Sapon. No. | 12.8 | 2.5 | 1.0 | nil. |
| Bromine No. | 12 | | 0 | 0. |
| Steam, Non-Volatile | Feed | | | |
| Wt. Percent on Feed | | 40 | 29 | 38. |
| Gravity, ° API | 36.6 | 28.0 | 29.5 | 30.7. |
| Acid No. | nil | 11 | 16 | 6.5. |
| Sapon. No. | 12.8 | 14 | 19 | 15. |
| Bromine No. | 12 | 2 | 6 | |

The data shown in Table V below indicates the desirable effect obtained when a metal salt catalyst promoter, in this case, nickelous acetate, was used in conjunction with the boron trifluoride catalyst. A yield of 59.3% was obtained when the promoter was employed, in comparison with the yield of 49.6% obtained when no promoter was used, both reactions being carried out on the same starting feed stock and under comparable conditions.

TABLE V

| Run No. | 4 | 5 |
|---|---|---|
| Feed | C₇ Oxo Bottoms | C₇ Oxo Bottoms. |
| Catalyst | Boron Trifluoride | Boron Trifluoride. |
| Mole Ratio, Feed/Catalyst | 1/0.67 | 1/0.6. |
| Catalyst Promoter | None | Nickelous Acetate. |
| Mole Ratio, Feed/Promoter | | 1/0.06. |
| Added Gas | Carbon Monoxide | Carbon Monoxide. |
| Pressure, p. s. i. g | 3,500 | 3,500. |
| Temperature, °F | 300 | 300. |
| Hours of Run | 5 | 5. |
| Wt. Percent Recovery, based on Liquids+Solids Charged | 107 | 106. |
| Wt. Percent Fatty Acids, Based on Olefin | 49.6 | 59.3. |
| Wt. Percent Unsaponifiable on Feed | 44.2 | 32.0. |

Table VI shows the adverse effect of water on the production of acids from C₇ Oxo bottoms using a boron trifluoride catalyst, the yield of acid in weight percent based on the feed being reduced from 65% to 11% when about two moles of water was introduced into the acid synthesis for each mole of C₇ Oxo bottoms employed as feed. This is shown by a comparison of Run 7 with Run 6. Run 8 shows the distinctly inferior yields obtained when nickel carbonyl was employed as a catalyst rather than boron trifluoride. Thus, it is indicated that although the metal carbonyls are operative, they are not the preferred catalysts for converting such mixtures as Oxo bottoms to acid products by catalytic reaction with carbon monoxide.

TABLE VI

| Run No. | 6 | 7 | 8 |
|---|---|---|---|
| Feed | C₇ Oxo Bottoms | C₇ Oxo Bottoms | C₇ Oxo Bottoms. |
| Catalyst | BF₃ | BF₃ | Ni(CO)₄. |
| Moles Ni(AC), Cat. Promotor/Mole Feed | 0 | 0 | 0.25. |
| Mole Ratio, Feed/Water/Catalyst | 1/0.8¹ | 1/2.1/1 | 1/4.9/0.3. |
| Added Gas | Carbon Monoxide | Carbon Monoxide | Carbon Monoxide. |
| Pressure, p. s. i. g | 3,500 | 3,500 | 4,800. |
| Temperature, °F | 250 | 300 | 505. |
| Hours of Run | 5 | 5 | 12. |
| Recovered Product | | | |
| Gravity, °API | 26.4 | 34.8 | 33.4. |
| Acid No | 173 | 23 | 10. |
| Saponification No | 184 | 47 | 86. |
| Bromine No | | 31 | 10. |
| Recovered Acids *Original Feed* | | | |
| Wt. Percent on Feed | 65 | 11 | 5. |
| Gravity, °API | 34.3    23.1 | 21.0 | 20.6. |
| Acid No | 0    248 | 323 | 325. |
| Saponification No | 22    248 | 330 | 324. |
| Bromine No | | | 0. |
| Hydroxyl No | 107 | | |
| Unsaponifiable: | | | |
| Steam, Voltatile *Original Feed* | | | |
| Wt. Percent on Feed | 8 | 25 | 24. |
| Gravity, °API | 34.3    43.3 | 42.1 | 39. |
| Acid No | 0    1 | 0 | 0. |
| Saponification No | 22    6 | 9 | 4. |
| Bromine No | 6 | 42 | 15. |
| Hydroxyl No | 107    16 | 65 | 88. |
| Steam, Non-Voltaile *Original Feed* | | | |
| Wt. Percent on Feed | 23 | 83 | 37. |
| Gravity, °API | 34.3    27.8 | 35.2 | 34.4. |
| Acid No | 0    3 | Nil | Nil. |
| Saponification No | 22    7 | Nil | 20. |
| Bromine No | | 28 | 4. |
| Hydroxyl No | 107    13 | 6 | 107. |

¹ Ratio feed/catalyst.

EXAMPLE I

A typical experiment employing the process of this invention was carried out in the following manner. Oxo bottoms which were obtained as a bottom fraction from a fractionating tower in which an Oxo alcohol product obtained from a C₇ olefin stream was separated, were employed as feed. This feed stock was introduced into an autoclave together with boron trifluoride in a mole ratio of 1 to 0.8 moles of feed per mole of catalyst. Carbon monoxide was added to obtain a pressure of about 3500 p. s. i. g. The resulting reaction mixture was maintained at a temperature of 250° F. for approximately 5 hours of reaction time. No water was employed in carrying out the reaction. At the end of the reaction period, excess carbon monoxide and boron trifluoride were allowed to separate from the liquid reaction mixture which was then water-washed to remove dissolved boron trifluoride. An excess of aqueous caustic was then added to the washed reaction mixture in order to saponify the acids present. The resulting mixture was extracted with petroleum ether to remove the unsaponifiable portion and the extract separated from the soaps. The unsaponifiable material was subsequently recovered from the petroleum ether extract. The soaps were treated with dilute sulfuric acid and the fatty acids recovered therefrom. If desired, the recovered acids may be further purified by vacuum distillation. In this case, the recovered acidic product was substantially all acid as indicated by the acid number and saponification number, both of which were 248. The bromine number was 0, indicating absence of olefinic material. The weight percent of recovered acids based on the feed was 65%.

Carbon monoxide gas used in this example was of about 95% purity. However, impure carbon monoxide can also be used, provided no materials are present which interfere with the acid synthesis.

Products obtained as the separate fractions by this synthesis process may be utilized as such or they may be converted into other useful derivatives as desired. The acidic fraction comprising a mixture of carboxylic acids can, for instance, be made into various metal salts, thus forming the corresponding soaps, these being particularly useful as compositions for greases. As an alternative use, the acids can be converted to any kind of derivative of the carboxylic group, as for instance, an ester or an amide.

What is claimed is:

1. A method for preparing higher molecular weight aliphatic carboxylic acids which comprises reacting a mixture of oxygenated organic compounds having at least ten carbon atoms per molecule, said mixture being obtained as a bottoms fraction by distillation of a crude Oxo alcohol mixture derived by the Oxo process from a $C_7$ olefinic hydrocarbon stream, with carbon monoxide in the presence of an acidic carboxylation catalyst at temperatures of from 100°–300° F. and pressures of from 500 to 10,000 p. s. i. g., in the absence of water and separating the thus produced higher molecular weight aliphatic carboxylic acids from the resulting reaction mixture.

2. A method for the preparation of higher molecular weight aliphatic carboxylic acids which comprises carboxylating a mixture of oxygenated organic compounds having from about 10 to 20 carbon atoms per molecule, said mixture being obtained as a higher-boiling bottoms fraction by distillation of a crude $C_7$ Oxo alcohol, with carbon monoxide in the presence of boron trifluoride at temperatures of from 200°–300° F. and pressures of from 3,000 to 5,000 p. s. i. g., in the absence of water and recovering the higher molecular weight aliphatic carboxylic acids from the resulting reaction mixture.

3. A process according to claim 2 in which the mole ratio of oxygenated organic compounds to boron trifluoride is maintained in the range of 1/0.1 to 1/1.

4. A process according to claim 2 in which nickel acetate is employed as a catalyst promoter.

5. A method for the preparation of higher molecular weight acidic products which comprises subjecting a $C_7$ olefinic hydrocarbon stream to the Oxo reaction, whereby there is produced a mixture of oxygenated organic compounds containing substantial amounts of iso-octyl alcohol together with higher-boiling organic compounds, including alcohols having more than 8 carbon atoms, aldehydes, ketones, acetals, esters, and ethers, distilling said mixture of oxygenated organic compounds to produce a relatively pure $C_7$ Oxo alcohol fraction and a bottoms fraction comprising a mixture of said higher-boiling organic compounds, a substantial portion of which have at least ten carbon atoms per molecule, reacting said mixture of higher-boiling organic compounds with carbon monoxide in the presence of an acidic carboxylation catalyst at temperatures of from 100°–300° F. and pressures of from 500 to 10,000 p. s. i. g., in the absence of water and recovering the higher molecular weight acidic products so produced from the reaction mixture.

6. A method for the preparation of higher molecular weight aliphatic carboxylic acids which comprises subjecting a $C_7$ olefinic hydrocarbon stream to the Oxo reaction, whereby there is produced a mixture of oxygenated organic compounds containing substantial amounts of iso-octyl alcohol together with higher-boiling organic compounds, including alcohols having more than eight carbon atoms, aldehydes, ketones, acetals, esters, and ethers, distilling said mixture of oxygenated organic compounds to produce a relatively pure $C_7$ Oxo alcohol fraction and a bottoms fraction comprising a mixture of said higher-boiling organic compounds, a major portion of which have at least ten carbon atoms per molecule, reacting said mixture of higher-boiling organic compounds with carbon monoxide in the presence of boron trifluoride at temperatures of from 200°–300° F. and pressures of from 3,000 to 5,000 p. s. i. g., in the absence of water and recovering the higher molecular weight aliphatic carboxylic acids so produced from the reaction mixture.

RALPH BURGESS MASON.

References Cited in the file of this patent

UNITED STATES PATENTS

| Number | Name | Date |
|---|---|---|
| 2,135,453 | Loder | Nov. 1, 1938 |

FOREIGN PATENTS

| Number | Country | Date |
|---|---|---|
| 486,669 | Great Britain | June 8, 1938 |